(12) United States Patent
Kim

(10) Patent No.: US 11,318,601 B2
(45) Date of Patent: May 3, 2022

(54) GRIP TONGS APPARATUS

(71) Applicant: Jin Mook Kim, Gyeonggi-do (KR)

(72) Inventor: Jin Mook Kim, Gyeonggi-do (KR)

( * ) Notice: Subject to any disclaimer, the term of this patent is extended or adjusted under 35 U.S.C. 154(b) by 0 days.

(21) Appl. No.: 17/017,760

(22) Filed: Sep. 11, 2020

(65) Prior Publication Data

US 2022/0040843 A1 Feb. 10, 2022

(30) Foreign Application Priority Data

Aug. 4, 2020 (KR) .......................... 10-2020-0097276

(51) Int. Cl.
*B25J 1/04* (2006.01)
*B25J 15/00* (2006.01)

(52) U.S. Cl.
CPC ............. *B25J 1/04* (2013.01); *B25J 15/0028* (2013.01)

(58) Field of Classification Search
CPC ................. B25J 1/02; B25J 1/04; A47F 13/06
USPC ......................................................... 294/209
See application file for complete search history.

(56) References Cited

U.S. PATENT DOCUMENTS

| | | | | |
|---|---|---|---|---|
| 1,350,331 A * | 8/1920 | Pedersen | ..................... | B25J 1/04 294/23 |
| 2,181,520 A * | 11/1939 | Pedersen | ..................... | B25J 1/04 294/22 |
| 3,591,226 A * | 7/1971 | Elmore, Jr | ............. | A47G 25/82 294/104 |
| 4,669,769 A * | 6/1987 | Polder, Jr. | ................. | B25B 7/12 294/111 |
| 5,380,054 A * | 1/1995 | Galvis | ................... | E01H 1/1206 294/1.4 |
| 7,344,171 B1 * | 3/2008 | McMullan | ................ | B25B 7/12 294/111 |
| 7,686,361 B1 * | 3/2010 | Flinn | ..................... | E01H 1/1206 294/1.4 |
| 9,931,748 B2 * | 4/2018 | Buzby | ....................... | B25B 9/00 |

FOREIGN PATENT DOCUMENTS

KR 20-0488575 Y1 2/2019

* cited by examiner

*Primary Examiner* — Dean J Kramer
(74) *Attorney, Agent, or Firm* — Rabin & Berdo, P.C

(57) ABSTRACT

When the push handle is manipulated, the manipulation lever is pulled by the wire so that the tong portions are parted. When manipulation of the push handle is released, the tong portions are pressed against each other so that the item may be easily fixed between the tong portions. When the manipulation of the push handle is released, the tong portions are rotated and automatically clamp the item located therebetween so that it is unnecessary to continuously manipulate the push handle to fix the item between the tong portions and it is possible to reduce an amount of grip used as well as reducing a manipulation time of the push handle and to prevent fatigability accumulating in hands or damage to hands due to the reduction in manipulation time of the push handle.

5 Claims, 6 Drawing Sheets

[FIG 1]
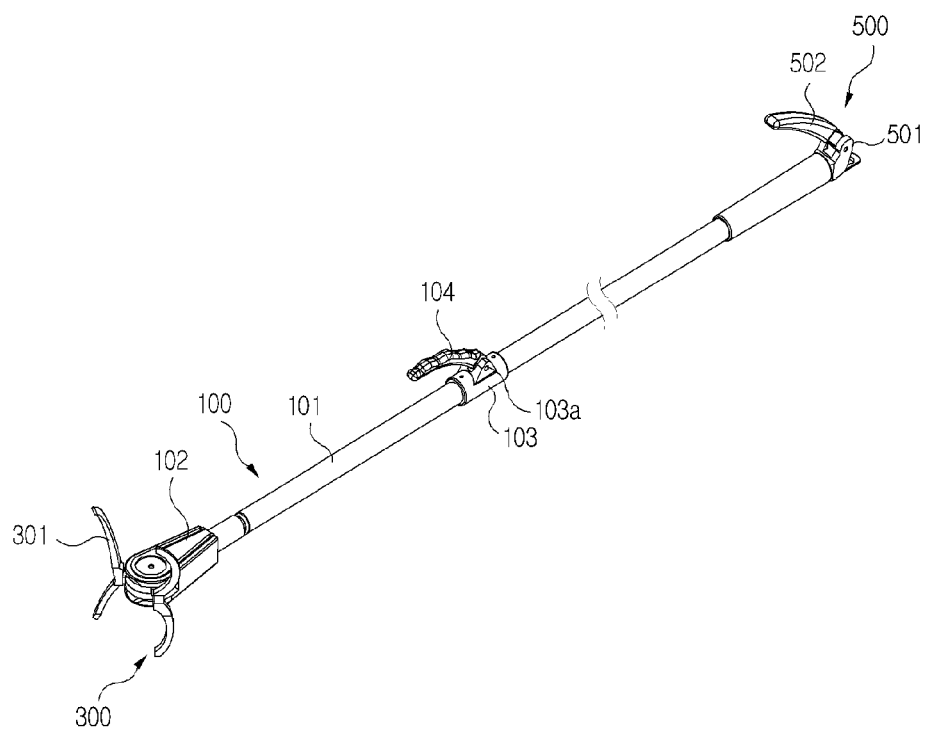

[FIG 2]
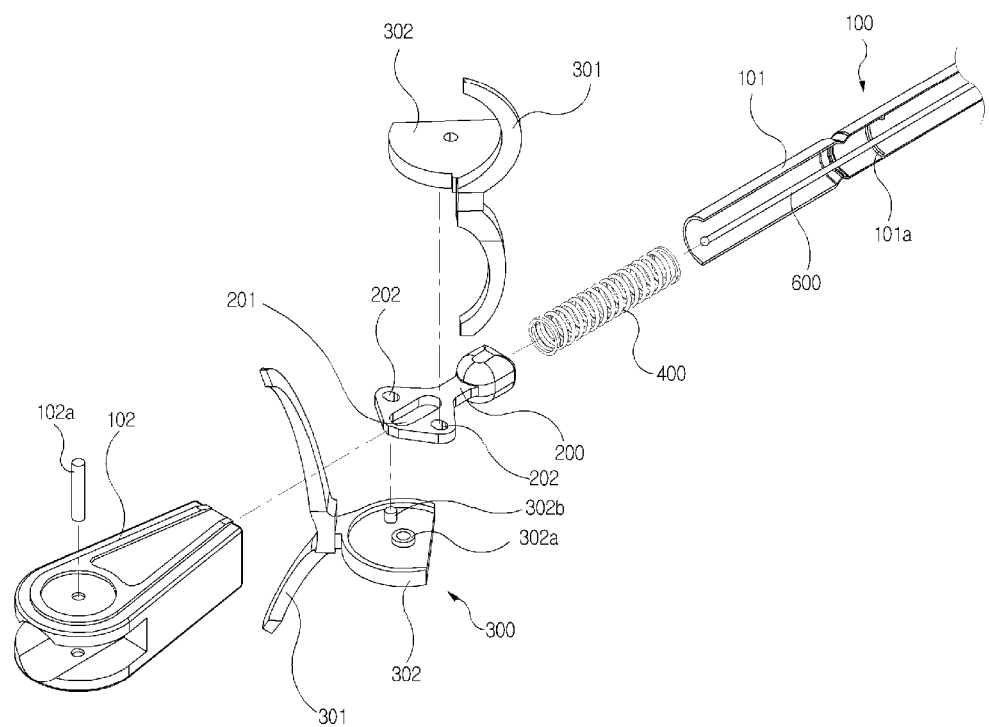

[FIG 3]
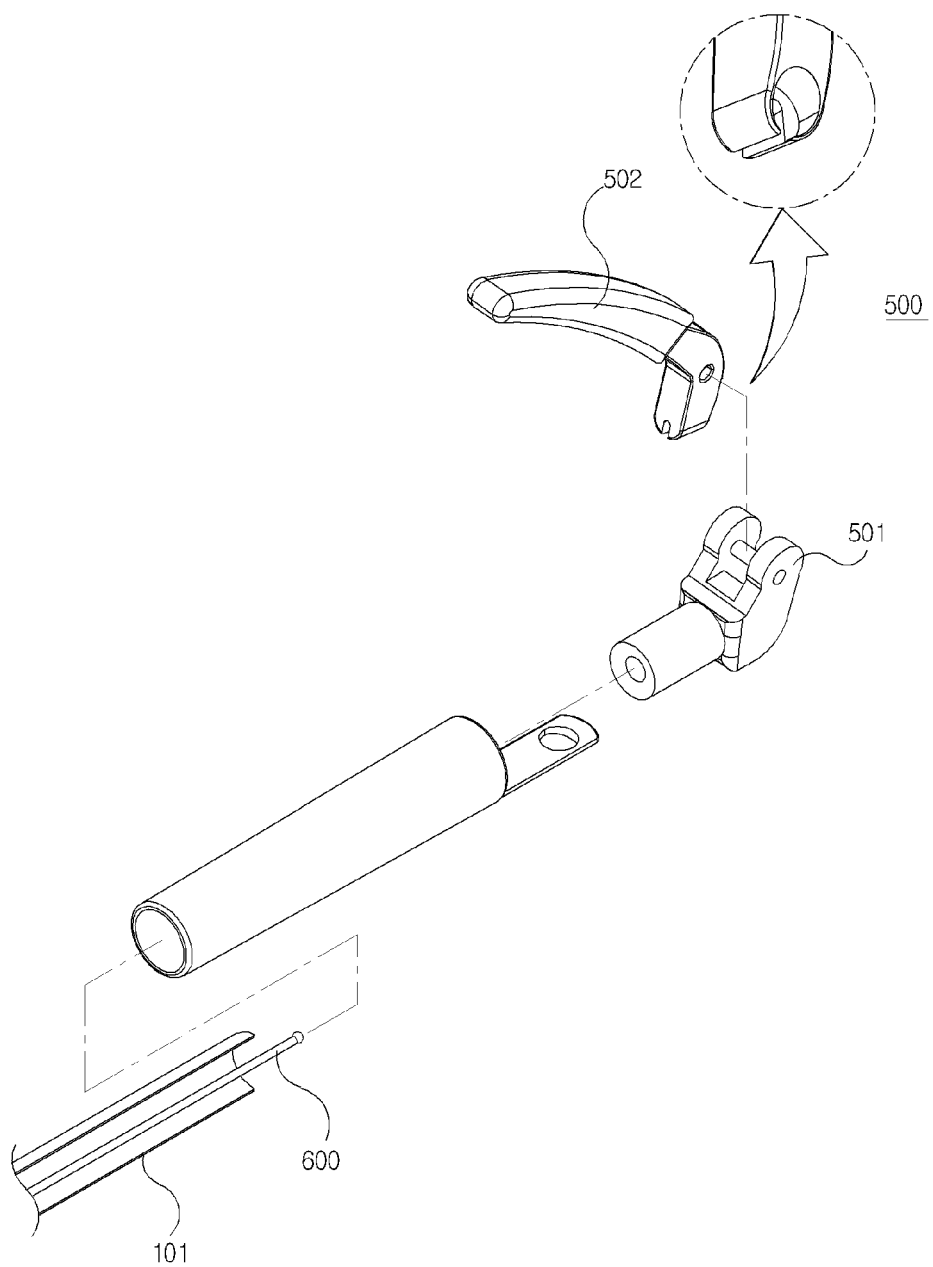

[FIG 4]
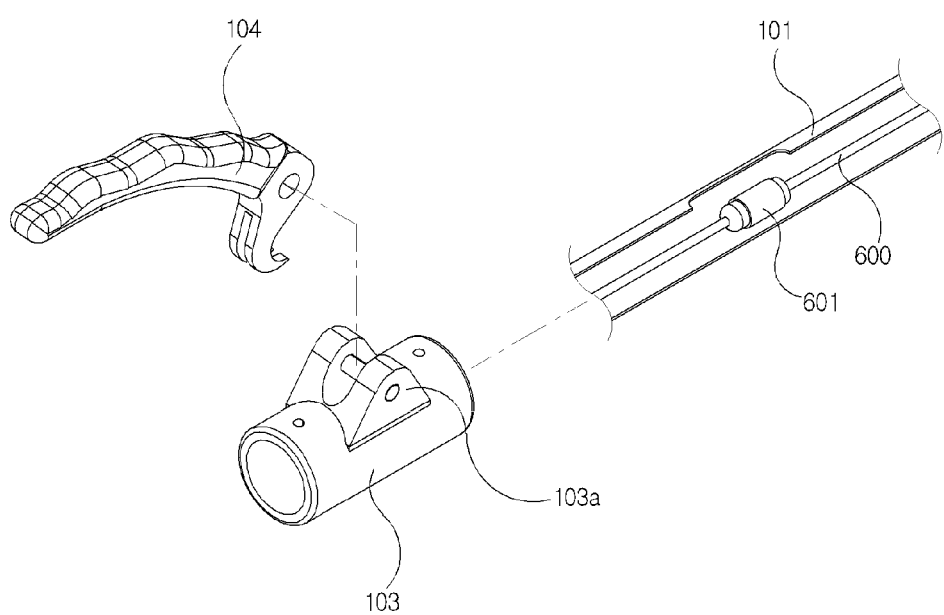

[FIG 5]
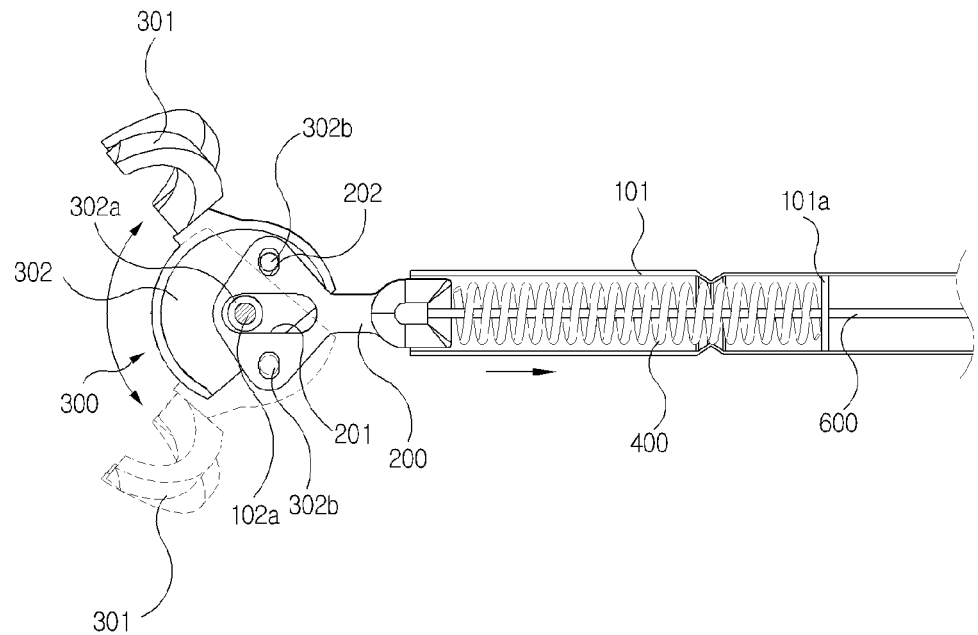
[FIG 6]
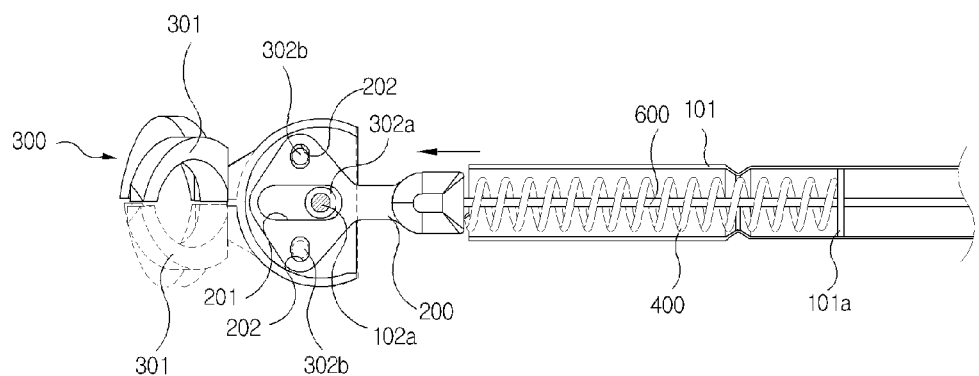

[FIG 7]
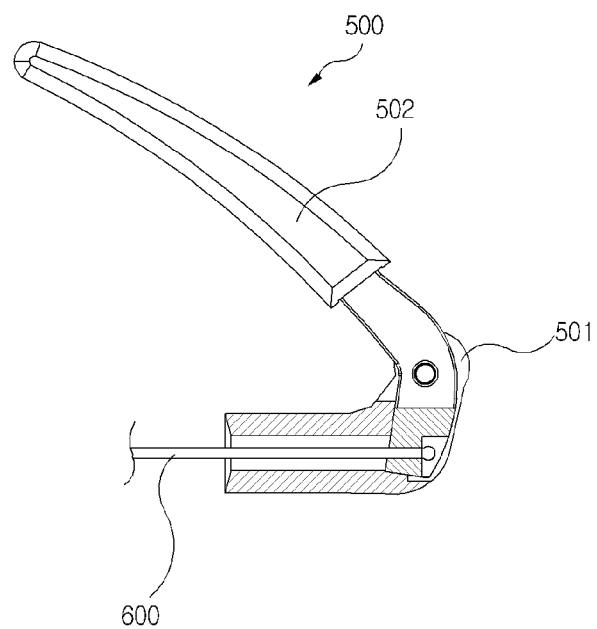
[FIG 8]
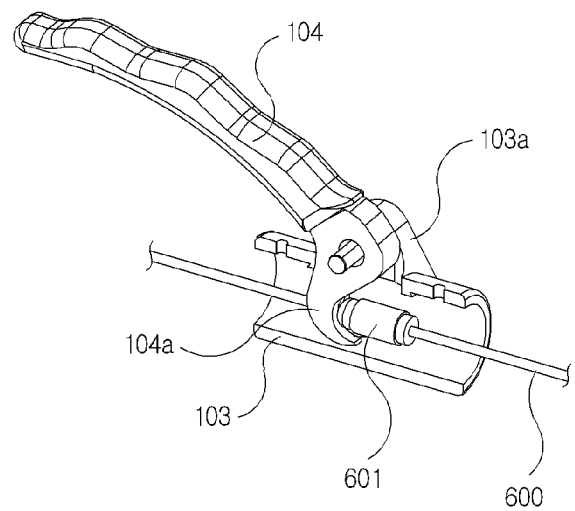

GRIP TONGS APPARATUS

CROSS REFERENCE TO RELATED APPLICATIONS

This application claims priority to Application No. KR 10-2020-0097276 filed in Korea on Aug. 4, 2020. The entire contents of this application are hereby incorporated by reference.

BACKGROUND

1. Field of the Invention

The present invention relates to a tongs apparatus, and more particularly, to a grip tongs apparatus in which a manipulation lever recedes due to a pulling force of a wire and pulls tong portions when a push handle is manipulated while the tong portions are rotated about a rotation-supporting portion so that tongs are parted.

2. Discussion of Related Art

Generally, tongs are mainly used for gripping and moving an item to another place when the item is at a distance not reachable by a hand of a user or the user is unwilling to directly hold the item.

Particularly, when it is necessary to arrange shoes taken off by people in a sedentary restaurant or the like, shoes may be easily held and moved using tongs while standing upright so as to prevent contamination by a variety of pathogenic bacteria, such as fungi causing athlete's foot in shoes, or to keep the restaurant clean.

Also, when it is necessary to retrieve an item disposed at a place high in a store or at home, it is possible to easily hold and retrieve the time while standing upright.

Patent Document 1 discloses conventional versatile tongs which include an operation portion having a hollow shape with an open bottom end and including an operation lever formed thereinside and rotatably operated, a body portion having a hollow shape, connected to one side of the operation portion, and extending lengthwise in a longitudinal direction, tong portions rotatably installed on the other end of the body portion to face each other or to be parted in opposite directions, and a connection rod located inside the body portion and having both ends connected to the operation portion and the tong portions respectively to be pulled by the operation lever of the operation portion to pull and rotate the tong portions.

Here, when the operation lever of the operation portion is pushed, the operation lever is rotated about second and third hinge holes. Here, an operation lever connection hook of the connection rod connected to the operation lever is moved along a long hole of a handle portion and pulls the connection rod.

Accordingly, as the connection rod is pulled, an elastic member installed at an end of the connection rod is pushed so that tong-supporting pieces of the tong portions connected to the elastic member are mutually rotated about a first hinge hole in directions facing each other to be pressed against each other.

Here, an item is located between the tong-supporting pieces and is clamped and fixed between the tong-supporting pieces.

Subsequently, when a push pressure on the operation lever is released, as the operation lever connection hook returns to an original position along the long hole, a pulling force of the connection rod is released so that the elastic member is restored to an original state and the tong-supporting pieces of the tong portions are parted. However, in Patent Document 1, when the operation lever is pulled, the connection rod is pulled and presses the tong-supporting pieces against each other so as to clamp an item between the tong-supporting pieces. Here, it is inconvenient to continuously maintain a pushed state of the operation lever throughout while the item is clamped and fixed between the tong-supporting pieces. While the item is clamped between the tong-supporting pieces and moved, as the operation lever is pushed with a psychologically excessive grip, an excessive grip is used. Since a time that the operation lever is pushed repetitively increases whenever an item is lifted or moved using the tong-supporting pieces, it is inconvenient to continuously use gripping. Particularly, as the gripping is excessively or continuously used, fatigability in hands increases or damage to hands is caused so that physical treatment is necessary. Also, since the old and the infirm or children, who have relatively weak grip, have a difficulty in maintaining a state of clamping an item between the tong-supporting pieces, reliability in a product is degraded.

RELATED ART DOCUMENT

Patent Document
Patent Document 1: KR20-0488575 Y1

SUMMARY OF THE INVENTION

The present invention is directed to providing a grip tongs apparatus including a body including a support ring formed on an inner circumferential surface thereof and a rotation-supporting portion formed on one end thereof, a manipulation lever installed to be slidably coupled to an end of the body and laterally moved in the rotation-supporting portion, tong portions formed above and below the manipulation lever to be symmetrical to each other and each including a tong formed on an outer surface thereof pulled or pushed by the manipulation lever and rotated about the rotation-supporting portion, an elastic spring between the support ring and the manipulation lever, and a push handle operated to rotate and formed on the other end of the body. Here, the manipulation lever and the push handle are connected using a wire so that the wire is pulled by manipulating the push handle and pulls the manipulation lever. Here, the manipulation lever pushes and compresses the elastic spring and pulls the tong portions so that the tong portions are rotated about the rotation-supporting portion to be parted in directions opposite to directions facing each other.

According to an embodiment of the present invention, there is provided a grip tongs apparatus including a body having a hollow shape with an open front and rear, including a support ring formed on an inner circumferential surface of one end thereof and having a rotation-supporting portion formed on the one end, a manipulation lever having one end slidably coupled to the one end of the body and the other end located in the rotation-supporting portion so as to slidably move in the rotation-supporting portion in a horizontal direction, a pair of tong portions formed to be vertically symmetrical to each other on the basis of the manipulation lever, each including a tong formed on an outer surface thereof, and rotatably installed on the rotation-supporting portion so as to rotate on the rotation-supporting portion in directions facing each other or in directions opposite to the directions facing each other while being pulled or pushed by the manipulation lever, an elastic spring installed between the support ring and the manipulation lever, compressed by the manipulation lever, and then restored to an original state so as to push the manipulation lever, a push handle rotatably installed on the other end of the body and operated to rotate, and a wire installed to connect the manipulation lever to the push handle and pulled by rotation of the push handle to pull the manipulation lever. The body may include a tubular body configured to communicate with the rotation-supporting portion so as to slidably couple the manipulation lever to an inside of one end of the rotation-supporting portion. Also, the rotation-supporting portion may further include a rotational shaft fastened to a central part thereof to pass through the manipulation lever and the tong portions so as to guide horizontal movement of the manipulation lever in the rotation-supporting portion and to guide the tongs of the tong portions to rotate.

The manipulation lever may include a guide hole formed to pass through a central part thereof in a longitudinal direction and more laterally moved on the basis of the rotational shaft of the rotation-supporting portion and include a pair of coupling holes formed on both sides of the guide hole to be opposite to each other. Also, the tong portions may each further include a rotational plate portion which is bent and extends from the tong and includes a rotational protruding portion formed in a central part to be inserted into and coupled to the guide hole to allow the rotational shaft to pass through a center thereof and includes a coupling protrusion formed on one side of the rotational protruding portion to be inserted into and coupled to the coupling hole to rotate the tong while being pulled or pushed.

The push handle may include a first rotation-supporting body having one end inserted into and fixed to the other end of the body and the other end exposed on the other end of the body and a handle rotatably installed on the first rotation-supporting body to hold one end of the wire at a bottom end thereof to pull the wire.

The wire may further include a holding member formed on an outer surface thereof and located inside the body. Also, the body may further include an auxiliary rotational body having a hollow shape with an open front and rear, fixedly installed at a determined position of the body, and including a second rotation-supporting body thereabove, and an auxiliary handle rotatably installed on the second rotation-supporting body and having one end exposed above the auxiliary rotational body and the other end located inside the body to pull the holding member of the wire.

The auxiliary handle may include a trigger which is formed at a bottom end thereof, has a hook shape to allow the wire to pass therethrough, and surrounds one end of the holding member to pull the holding member.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a perspective view of a grip tongs apparatus according to the present invention;

FIG. 2 is an exploded perspective view illustrating a rotation-supporting portion of the grip tongs apparatus according to the present invention;

FIG. 3 is an exploded perspective view illustrating a push handle of the grip tongs apparatus according to the present invention;

FIG. 4 is an exploded perspective view illustrating an auxiliary handle of the grip tongs apparatus according to the present invention;

FIG. 5 is a top cross-sectional view illustrating a state in which tongs of the grip tongs apparatus according to the present invention are parted;

FIG. 6 is a top cross-sectional view illustrating a state in which tongs of the grip tongs apparatus according to the present invention are pressed against each other;

FIG. 7 is a side cross-sectional view illustrating the push handle of the grip tongs apparatus according to the present invention; and FIG. 8 is a side cross-sectional view illustrating the auxiliary handle of the grip tongs apparatus according to the present invention.

DETAILED DESCRIPTION OF EXEMPLARY EMBODIMENTS

Hereinafter, an embodiment of the present invention will be described in detail with reference to the attached drawings.

Referring to FIGS. 1 to 8, a body 100 has a hollow shape with an open front and rear and includes a support ring 101*a* on an inner circumferential surface of one end and a rotation-supporting portion 102 formed on the one end.

The rotation-supporting portion 102 supports rotation of a tong portion 300.

The support ring 101*a* supports an elastic spring 400 while a wire 600 passes through a central part thereof.

The support ring 101*a* is fixedly installed on the inner circumferential surface of the body 100 while being spaced at a determined distance apart from the one end of the body 100.

The body 100 includes a tubular body 101 configured to communicate with the rotation-supporting portion 102 and having one end to which a manipulation lever 200 is internally and slidably coupled.

The tubular body 101 has a hollow shape with an open front and rear and is coupled to and communicates with the rotation-supporting portion 102.

The rotation-supporting portion 102 further includes a rotational shaft 102*a* fastened to a central part thereof to pass through the manipulation lever 200 and the tong portion 300 and configured to guide a rotational operation of a tong 301 of the tong portion 300 while guiding horizontal movement of the manipulation lever 200 in the rotation-supporting portion 102.

The rotational shaft 102*a* is formed to pass through a rotational plate portion 302 of the tong portion 300 and a guide hole 201 of the manipulation lever 200.

The rotational shaft 102*a* is fastened to pass through a central part of a rotational protruding portion 302*a* formed on the rotational plate portion 302 of the tong portion 300 and supports the rotational plate portion 302 of the tong portion 300 to rotate.

The body 100 further includes an auxiliary rotational body 103 having a hollow shape with an open front and rear and fixedly installed at a determined position of the body 100 to form a second rotation-supporting body 103*a* thereabove and further includes an auxiliary handle 104 rotatably installed on the second rotation-supporting body 103*a*, having one end exposed above the auxiliary rotational body 103 and the other end located inside the body 100 so as to pull a holding member 601 of the wire 600.

The auxiliary rotational body 103 may be installed to surround an outer surface of the tubular body 101 of the body 100.

The auxiliary rotational body 103 may be installed on the outer surface of the tubular body 101 to be close to the rotation-supporting portion 102.

The auxiliary handle 104 rotates about the second rotation-supporting body 103a and pulls the holding member 601 of the wire 600.

The auxiliary handle 104 includes a trigger 104a formed at a bottom end which has a hook shape to allow the wire 600 to pass therethrough and surrounds one end of the holding member 601 to pull the holding member 601.

The trigger 104a prevents the holding member 601 of the wire 600 from moving more than a determined distance toward the rotation-supporting portion 102.

One end of the manipulation lever 200 is slidably coupled to one end of the body 100 and the other end thereof is located in the rotation-supporting portion 102 so that the manipulation lever 200 slidably moves in a horizontal direction in the rotation-supporting portion 102.

The other end of manipulation lever 200 is connected to the wire 600 to be pulled by the wire 600 and compresses the elastic spring 400 while pulling and rotating the tong portions 300 to be parted.

The manipulation lever 200 includes a guide hole 201 formed at a central part to pass therethrough in a longitudinal direction and configured to horizontally move on the basis of the rotational shaft 102a of the rotation-supporting portion 102 and includes a pair of coupling holes 202 opposite to each other on both sides of the guide hole 201.

The guide hole 201 is guided by the rotational protruding portion 302a of the rotational plate portion 302 to move back and forth horizontally so as to horizontally move the manipulation lever 200.

The coupling holes 202 pull coupling protrusions 302b of the tong portions 300 to allow the tong portions 300 to be parted or push the coupling protrusions 302b to allow the tong portions 300 to be pressed against each other due to the manipulation lever 200 which is moved horizontally.

A pair of such tong portions 300 are formed to be vertically symmetrical to each other on the basis of the manipulation lever 200 and include the tongs 301 formed on outer surfaces thereof and rotatably installed on the rotation-supporting portion 102 to be pulled or pushed by the manipulation lever 200 to rotate on the rotation-supporting portion 102 in facing directions or in directions opposite thereto.

The tong portions 300 are rotated in directions facing each other to be pressed against each other by the manipulation lever 200 which moves toward the rotation-supporting portion 102 and are rotated in directions opposite the directions facing each other to be parted from each other by the manipulation lever 200 which moves in a direction being away from the rotation-supporting portion 102.

The tong portions 300 clamp and fix an item therebetween or release an item held therebetween.

The tong portion 300 further includes the rotational plate portion 302, which is bent and extends from the tong 301 and has the rotational protruding portion 302a inserted into and coupled to the guide hole 201 in a central part of the tong 301 to allow the rotational shaft 102a to pass therethrough and the coupling protrusion 302b which is formed on one side of the rotational protruding portion 302a and inserted into and coupled to the coupling hole 202 to be pulled or pushed so as to rotate the tong 301.

The rotational plate portion 302 is rotated about the rotational shaft 102a forward or backward so as to rotate the tongs 301 of the tong portions 300 to be pressed against or spaced apart from each other.

The rotational protruding portion 302a is rotated about the rotational shaft 102a of the rotation-supporting portion 102 by the manipulation lever 200. The rotational protruding portions 302a guide movement of the guide hole 201 of the manipulation lever 200 so that the manipulation lever 200 horizontally moves back and forth while simultaneously being rotated about the rotational shaft 102a so that the tong portions 300 are pressed against each other or are parted from each other.

The coupling protrusions 302b are inserted into and coupled to the coupling holes 202 of the manipulation lever 200 and are pulled by or pushed away from the coupling holes 202 so as to guide the rotational protruding portions 302a of the rotational plate portion 302 to rotate forward or backward about the rotational shaft 102a.

The elastic spring 400 is installed between the support ring 101a and the manipulation lever 200 and is compressed and then restored to an original state by the manipulation lever 200 to push the manipulation lever 200.

The elastic spring 400 is pushed and compressed by the manipulation lever 200 pulled by the wire 600 to recede and then is restored to an original state and pushes the manipulation lever 200 toward the rotation-supporting portion 102.

An elastic force of the elastic spring 400 is proportional to a pushing force of the tongs of the tong portions 300 which are pressed against each other to face each other.

The push handle 500 is rotatably installed on the other end of the body 100 and is rotated.

The push handle 500 is pushed by the user and pulls the wire 600.

The push handle 500 includes a first rotation-supporting body 501 having one end inserted into and fixed to the other end of the body 100 and the other end exposed on the other end of the body 100 and includes a handle 502 rotatably installed on the first rotation-supporting body 501 to hold one end of the wire 600 at a bottom end thereof to pull the wire 600.

The handle 502 pulls the wire 600 to allow the manipulation lever 200 connected to the wire 600 to recede along the tubular body 101.

The handle 502 is rotated forward or backward about the first rotation-supporting body 501.

The wire 600 is installed to connect the manipulation lever 200 to the push handle 500 and is pulled by rotation of the push handle 500 to pull the manipulation lever 200.

The wire 600 may include spherical balls (without reference numerals) on both sides, which are held by the manipulation lever 200 and the push handle 500.

The grip tongs apparatus according to the present invention which includes the above components is used as follows.

First, the tubular body 101 of the body 100 is gripped to move the rotation-supporting portion 102 formed at an end of the tubular body 101 to a position of an item to be gripped.

Here, the pair of tong portions 300 symmetrical to each other are rotatably installed on the rotation-supporting portion 102 and remain in a state of being pressed against each other in a direction facing each other.

Subsequently, when the push handle 500 installed on the other end of the tubular body 101 opposite to the rotation-supporting portion 102 is pushed and pressurized, the handle 502 is rotated about the first rotation-supporting body 501 of the push handle 500 and pulls the wire 600 such that the manipulation lever 200 connected to the wire 600 recedes toward an inside of the tubular body 101.

Here, both ends of the wire 600 are held by and fixed to the handle 502 and the manipulation lever 200, respectively, such that the wire 600 is pulled by rotation of the handle 502 and moves the manipulation lever 200 backward.

Here, the manipulation lever 200 includes the guide hole 201 formed in a central part thereof. The guide hole 201 is guided by the rotational protruding portion 302a formed on the rotational plate portion 302 of the tong portion 300 to slide and move the manipulation lever 200 forward or backward.

Subsequently, the manipulation lever 200 moved backward by the wire 600 pushes the elastic spring 400 installed in the tubular body 101 and pressurizes the elastic spring 400 and simultaneously pulls the tong portion 300.

That is, when the guide hole 201 is guided by the rotational protruding portion 302a to slide and move the manipulation lever 200 backward, the coupling protrusions 302b of the rotational plate portion 302, which are coupled to the coupling holes 202 of the manipulation lever 200, are pulled by the coupling holes 202.

Here, as the rotational protruding portion 302a of the rotational plate portion 302 is pulled, the rotational protruding portion 302a is allowed to rotate about the rotational shaft 102a passing through and fastened to a central part of the rotation-supporting portion 102 so that the rotational plate portion 302 is rotated by the rotational protruding portion 302a and the tongs 301 formed on an outer surface thereof are parted from each other in opposite directions that face each other so as to space the tongs 301 apart.

Subsequently, an item to be gripped is located between the tongs 301 of the tong portions 300 which remain in a parted state due to a push operation of the push handle 500. In this state, the push operation of the push handle 500 is released.

Here, as soon as a pulling force of the wire 600 is released, the manipulation lever 200 is pushed by a restorable force of the elastic spring 400 and moved forward toward the rotation-supporting portion 102 so that the handle 502 is pulled and rotated about the first rotation-supporting body 501 so as to be restored to an original state.

Also, as the guide hole 201 of the manipulation lever 200 is guided by the rotational protruding portions 302a and slides and moves forward, the coupling holes 202 are moved forward so that the coupling protrusions 302b coupled to the coupling holes 202 are pushed forward by the coupling holes 202.

Accordingly, as the coupling protrusions 302b are pushed away and rotate the rotational protruding portions 302a, the rotational protruding portions 302a are rotated about the rotational shaft 102a and rotate the rotational plate portions 302. Here, the tongs 301 formed on the rotational plate portions 302 are pressed against each other in a direction facing each other so as to clamp and fix the item.

Here, the pushing force of the tongs 301 which clamp and fix the item may be proportional to the elastic force of the elastic spring 400.

Subsequently, when the item clamped between the tongs 301 is moved to a determined place while the tubular body 101 is gripped and then the handle 502 of the push handle 500 is pushed to be rotated about the first rotation-supporting body 501, the manipulation lever 200 is pulled by the wire 600 as described above to rotate the rotational plate portions 302 of the tong portions 300 so as to part the tongs 301 of the tong portions 300 in opposite directions that face each other so that the item clamped between the tongs 301 departs from the tongs 301.

Also, as described above, the tongs 301 of the tong portions 300 are parted by manipulating the push handle 500, the item is clamped between the tongs 301 by releasing the manipulated push handle 500, and consecutively, the item is moved to the determined place.

Meanwhile, the auxiliary rotational body 103 is installed on the outer surface of the tubular body 101 of the body 100. When the auxiliary handle 104 rotatably installed on the second rotation-supporting body 103a of the auxiliary rotational body 103 is pushed, the trigger 104a formed on the auxiliary handle 104 pulls the holding member 601 formed on the wire 600 in a direction away from the rotation-supporting portion 102.

Accordingly, the holding member 601 is pulled by the trigger 104a and recedes so as to pull the wire 600 so that the tongs 301 of the tong portions 300 are parted by the above method.

Here, the auxiliary handle 104 performs the same function as that of the handle 502 of the push handle 500. The tongs 301 of the tong portions 300 may be manipulated to be parted by selectively manipulating the auxiliary handle 104 or the push handle 500.

Also, the auxiliary rotational body 103 is installed on the outer surface of the tubular body at a position close to the tong portion 300 and is used when gripping the position close to the tong portion 300 and manipulating the tong portion 300.

Here, the auxiliary rotational body 103 is formed to be closer relatively close to the tong portion 300 in comparison to a distance from the push handle 500 to the tong portion 300.

In the above-described structure in which the manipulation lever 200 is moved backward by manipulating the push handle 500 and pulls the tong portions 300 so as to part the tongs 301 and then the manipulation lever 200 returns to an original position when manipulation of the push handle 500 is released and pushes the tong portions 300 so as to press the tongs 301 against each other, the manipulation lever 200 is pulled when the push handle 500 is manipulated so that the tong portions 300 are parted. Also, when the manipulation of the push handle 500 is released, the tong portions 300 are pressed against each other so as to easily fix an item between the tong portions 300. When the manipulation of the push handle 500 is released, the tong portions 300 are rotated so as to automatically clamp the item located therebetween. Accordingly, it is unnecessary to continuously manipulate the push handle 500 to fix the item between the tong portions 300. Also, the push handle 500 may be manipulated using a one-touch method and the manipulation of the push handle 500 may be quickly released so as to reduce a manipulation time of the push handle 500 as well as an amount of grip used. Due to the reduction in manipulation time of the push handle 500, it is possible to prevent fatigability in hands from accumulating or to prevent damage to the hands.

Accordingly, when the push handle is manipulated, the manipulation lever is pulled by the wire so that the tong portions are parted. When manipulation of the push handle is released, the tong portions are pressed against each other so that the item may be easily fixed between the tong portions. When the manipulation of the push handle is released, the tong portions are rotated and automatically clamp the item located therebetween so that it is unnecessary to continuously manipulate the push handle to fix the item between the tong portions and it is possible to reduce an amount of grip used as well as reducing a manipulation time of the push handle by quickly releasing manipulation of the push handle using a one-touch method and to prevent fatigability accumulating in hands or damage thereto due to the reduction in manipulation time of the push handle. Accordingly, the old and the infirm or children have no difficulty in fixing the item between the tong portions using the one-touch method so that reliability of a product is improved.

The above-described grip tongs apparatus according to the present invention is not limited to the embodiment, and the technical concept thereof is present within the range of being implemented by any one of ordinary skill in the art without departing from the essential of the present invention disclosed in the following claims.

What is claimed is:

1. A grip tongs apparatus comprising:
a body having a hollow shape with an open front and rear and comprising a support ring formed on an inner circumferential surface of one end thereof and a rotation-supporting portion formed on the one end;
a manipulation lever having one end slidably coupled to the one end of the body and the other end located in the rotation-supporting portion so as to slidably move in the rotation-supporting portion in a horizontal direction;
a pair of tong portions formed to be vertically symmetrical to each other on the basis of the manipulation lever, each comprising a tong formed on an outer surface thereof, and rotatably installed on the rotation-supporting portion so as to rotate about the rotation-supporting portion in directions facing each other or in directions opposite to the directions facing each other while being pulled or pushed by the manipulation lever;
an elastic spring installed between the support ring and the manipulation lever, compressed by the manipulation lever, and then restored to an original state so as to push the manipulation lever;
a push handle rotatably installed on the other end of the body and operated to rotate; and
a wire installed to connect the manipulation lever to the push handle and pulled by rotation of the push handle to pull the manipulation lever,
wherein the body comprises a tubular body configured to communicate with the rotation-supporting portion so as to slidably couple the manipulation lever to an inside of one end of the rotation-supporting portion, and
wherein the rotation-supporting portion further comprises a rotational shaft fastened to a central part thereof to pass through the manipulation lever and the tong portions so as to guide horizontal movement of the manipulation lever in the rotation-supporting portion and to guide the tongs of the tong portions to rotate.

2. The grip tongs apparatus of claim 1, wherein the manipulation lever comprises a guide hole formed in a central part thereof in a longitudinal direction and configured to be horizontally moved on the basis of the rotational shaft of the rotation-supporting portion and comprises a pair of coupling holes formed on both sides of the guide hole to be opposite to each other, and
wherein the tong portions each further comprise a rotational plate portion which is bent and extends from the tong and comprises a rotational protruding portion formed in a central part to be inserted into and coupled to the guide hole to allow the rotational shaft to pass through a center thereof and comprises a coupling protrusion formed on one side of the rotational protruding portion to be inserted into and coupled to the coupling hole to rotate the tong while being pulled or pushed.

3. The grip tongs apparatus of claim 1, wherein the push handle comprises:
a first rotation-supporting body having one end inserted into and fixed to the other end of the body and the other end exposed on the other end of the body; and
a handle rotatably installed on the first rotation-supporting body to hold one end of the wire at a bottom end thereof to pull the wire.

4. A grip tongs apparatus comprising:
a body having a hollow shape with an open front and rear and comprising a support ring formed on an inner circumferential surface of one end thereof and a rotation-supporting portion formed on the one end;
a manipulation lever having one end slidably coupled to the one end of the body and the other end located in the rotation-supporting portion so as to slidably move in the rotation-supporting portion in a horizontal direction;
a pair of tong portions formed to be vertically symmetrical to each other on the basis of the manipulation lever, each comprising a tong formed on an outer surface thereof, and rotatably installed on the rotation-supporting portion so as to rotate about the rotation-supporting portion in directions facing each other or in directions opposite to the directions facing each other while being pulled or pushed by the manipulation lever;
an elastic spring installed between the support ring and the manipulation lever, compressed by the manipulation lever, and then restored to an original state so as to push the manipulation lever;
a push handle rotatably installed on the other end of the body and operated to rotate; and
a wire installed to connect the manipulation lever to the push handle and pulled by rotation of the push handle to pull the manipulation lever,
wherein the wire further comprises a holding member formed on an outer surface thereof and located inside the body, and
wherein the body further comprises:
an auxiliary rotational body having a hollow shape with an open front and rear, fixedly installed at a determined position of the body, and comprising a second rotation-supporting body thereabove; and
an auxiliary handle rotatably installed on the second rotation-supporting body and having one end exposed above the auxiliary rotational body and the other end located inside the body to pull the holding member of the wire.

5. The grip tongs apparatus of claim 4, wherein the auxiliary handle comprises a trigger which is formed at a bottom end thereof, has a hook shape to allow the wire to pass therethrough, and surrounds one end of the holding member to pull the holding member.

* * * * *